US012712690B2

(12) United States Patent
Liu

(10) Patent No.: US 12,712,690 B2
(45) Date of Patent: Aug. 18, 2026

(54) SIGNAL CONFIGURATION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 397 days.

(21) Appl. No.: 18/263,798

(22) PCT Filed: Feb. 5, 2021

(86) PCT No.: PCT/CN2021/075667
§ 371 (c)(1),
(2) Date: Aug. 1, 2023

(87) PCT Pub. No.: WO2022/165778
PCT Pub. Date: Aug. 11, 2022

(65) Prior Publication Data
US 2024/0121054 A1 Apr. 11, 2024

(51) Int. Cl.
*H04W 4/00* (2018.01)
*H04L 1/00* (2006.01)
*H04L 5/00* (2006.01)

(52) U.S. Cl.
CPC ............ *H04L 5/005* (2013.01); *H04L 1/0038* (2013.01)

(58) Field of Classification Search
CPC ..... H04L 5/005; H04L 1/0038; H04L 5/0048; H04W 56/00; H04W 56/0015
USPC ................................................ 370/329, 330
See application file for complete search history.

(56) References Cited

U.S. PATENT DOCUMENTS

2016/0227526 A1 8/2016 Park et al.
2017/0033907 A1* 2/2017 Guan .................... H04L 5/0005
2017/0208588 A1* 7/2017 Park ........................ H04L 5/001
2019/0173554 A1* 6/2019 Kwak ................. H04B 7/0626
2019/0342052 A1* 11/2019 Hu .................... H04W 72/0453
2021/0329540 A1* 10/2021 Harada ................. H04W 8/005
2023/0078444 A1* 3/2023 Maleki .................. H04L 5/0094 370/311
2023/0083399 A1* 3/2023 Wang .................... H04L 5/0094 370/329
2023/0208587 A1* 6/2023 He .................... H04W 52/0232 370/329

(Continued)

FOREIGN PATENT DOCUMENTS

CN 103108405 A 5/2013
CN 104052532 A 9/2014

(Continued)

*Primary Examiner* — Chuong T Ho
(74) *Attorney, Agent, or Firm* — McCoy Russell LLP

(57) ABSTRACT

A method for configuring a signal, including: configuring at least one set of signal configuration information of a reference signal, wherein the signal configuration information is configured to indicate a detection method for the reference signal associated with the signal configuration information, the signal configuration information is at least configured to configure a transmission resource for the reference signal, the reference signal is at least configured for synchronization of idle user equipment (UE) and/or an inactive UE, and the reference signal is different from a synchronization signal block (SSB).

20 Claims, 3 Drawing Sheets

201: configure at least one set of signal configuration information of a reference signal, where the signal configuration information is configured to indicate a detection method for the reference signal associated with the signal configuration information, the signal configuration information is at least configured to configure a transmission resource for the reference signal, the reference signal is at least configured for synchronization of idle user equipment (UE) and/or inactive UE, and the reference signal is different from a synchronization signal block (SSB)

(56) References Cited

U.S. PATENT DOCUMENTS

2024/0063970 A1* 2/2024 Maleki .................. H04L 5/0051

FOREIGN PATENT DOCUMENTS

| | | | |
|---|---|---|---|
| CN | 108809595 | A | 11/2018 |
| CN | 109104754 | A | 12/2018 |
| CN | 110035447 | A | 7/2019 |
| CN | 110536229 | A | 12/2019 |
| CN | 111183701 | A | 5/2020 |
| CN | 111937450 | A | 11/2020 |
| WO | 2018231003 | A1 | 12/2018 |

* cited by examiner

SIGNAL CONFIGURATION METHOD AND APPARATUS, COMMUNICATION DEVICE AND STORAGE MEDIUM

CROSS REFERENCE TO RELATED APPLICATION

The present application is a U.S. National Phase of International Application No. PCT/CN2021/075667 entitled "SIGNAL CONFIGURATION METHOD AND APPARATUS, COMMUNICATION DEVICE, AND STORAGE MEDIUM," and filed on Feb. 5, 2021. The entire contents of the above-listed application are hereby incorporated by reference for all purposes.

BACKGROUND

As proposed in standardization of the 3rd generation partnership project (3GPP) of a power saving project of release 17 (R17), an additional tracking reference signal (TRS)/channel state information reference signal (CSI-RS) is used to assist user equipment (UE) to acquire time-domain and frequency-domain synchronization with a network in an idle state or an inactive state.

SUMMARY

According to a first aspect of an example of the disclosure, a method for configuring a signal is provided. The method is performed by a base station and includes:

configuring at least one set of signal configuration information of a reference signal, where signal configuration information is configured to indicate a detection method for the reference signal associated with the signal configuration information, the signal configuration information is at least configured to configure a transmission resource for the reference signal, the reference signal is at least configured for synchronization of idle user equipment (UE) and/or inactive UE, and the reference signal is different from a synchronization signal block (SSB).

According to a second aspect of an example of the disclosure, a method for detecting a signal is provided. The method is performed by UE and includes:

detecting, based on at least one set of signal configuration information of a reference signal, a reference signal associated with the signal configuration information, where the signal configuration information is at least configured to configure a transmission resource for the reference signal, the reference signal is at least configured for synchronization of idle UE and/or inactive UE, and the reference signal is different from an SSB.

According to a third aspect of an example of the disclosure, a communication device is provided. The communication device includes a processor, a memory and an executable program stored in the memory and capable of being run by the processor, where the processor executes steps of the method for configuring a signal according to the first aspect or the method for detecting a signal according to the second aspect.

According to a fourth aspect of an example of the disclosure, a non-transitory storage medium is provided. The non-transitory storage medium stores an executable program, where the executable program implements steps of the method for configuring a signal according to the first aspect or the method for detecting a signal according to the second aspect when executed by a processor.

BRIEF DESCRIPTION OF THE DRAWINGS

Accompanying drawings here are incorporated into the description as a constituent part of the description, illustrate examples conforming to the disclosure, and serve to explain principles of examples of the disclosure along with the description.

DETAILED DESCRIPTION

Examples will be described in detail here and shown in accompanying drawings illustratively. When the following description relates to accompanying drawings, unless otherwise specified, the same numeral in different accompanying drawings denotes the same or similar element. Embodiments described in the following examples do not denote all embodiments consistent with examples of the disclosure. On the contrary, the embodiments are merely examples of an apparatus and a method consistent with some aspects of examples of the disclosure as detailed in the appended claims.

Terms used in examples of the disclosure are merely to describe particular examples, and are not intended to limit examples of the disclosure. Singular forms such as "a", "an", "the" and "this" used in examples of the disclosure and the appended claims are also intended to include plural forms, unless otherwise clearly stated in the context. It should also be understood that term "and/or" used here refers to and contains any or all possible combinations of one or more of associated listed items.

It should be understood that although terms "first", "second", "third", etc. may be employed in examples of the disclosure to describe various information, such information should not be limited to these terms. These terms are merely used for distinguishing the same category of information from each other. For example, first information could also be referred to as second information, and similarly, second information could also be referred to as first information, without departing from the scope of examples of the disclosure. Depending on the context, word "if" as used here can be interpreted as "in the case that", "under the condition that" or "in response to determining".

The disclosure relates to, but is not limited to, the field of radio communication technologies, and particularly relates to signal configuration method and apparatus, communication device and storage medium.

As proposed in standardization of the 3rd generation partnership project (3GPP) of a power saving project of release 17 (R17), an additional tracking reference signal (TRS)/channel state information reference signal (CSI-RS) is used to assist user equipment (UE) to acquire time-domain and frequency-domain synchronization with a network in an idle state or an inactive state. Compared with synchronization using an original synchronization signal block (SSB) (synchronization signal/physical broadcast channel block (SS/PBCH block)), the TRS/CSI-RS can be configured to be closer to a paging occasion (PO), and the original SSB is farther away from the PO. In the case of synchronization using the SSB, the UE is required to be woken far in advance to be synchronized with the SSB. In the case of synchronization using the TRS/CSI-RS, the UE can be woken relatively late, so as to save more power.

Figure 1:
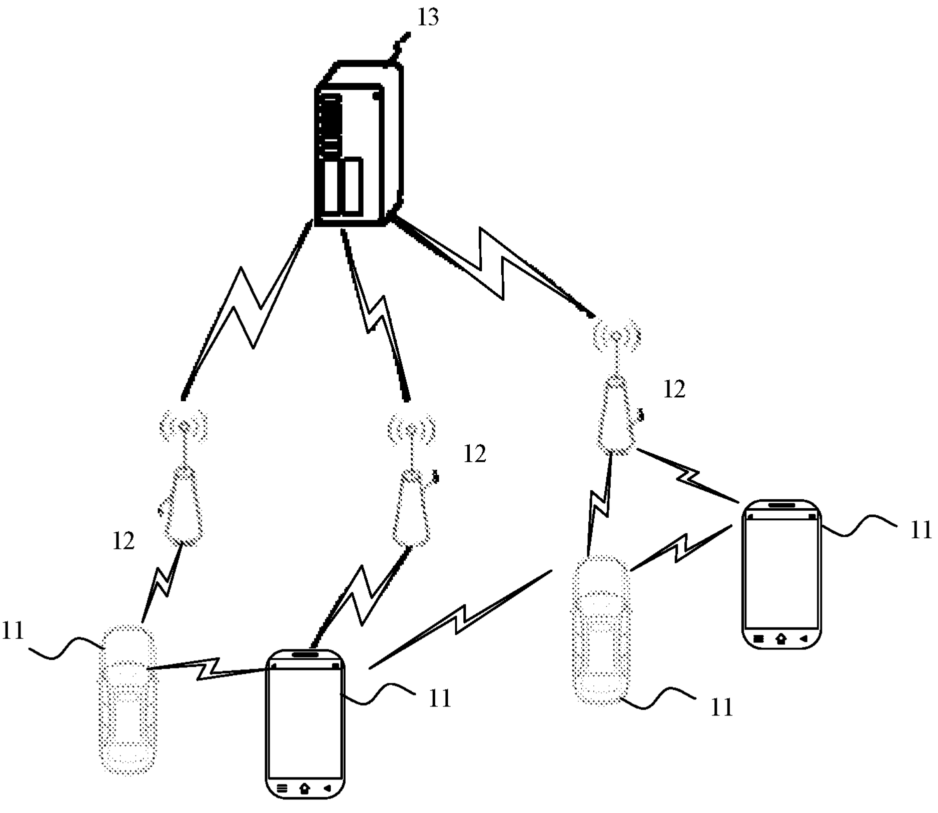
FIG. 1 is a schematic structural diagram of a radio communication system shown according to an example.

With reference to FIG. 1, a schematic structural diagram of a radio communication system according to an example of the disclosure is shown. As shown in FIG. 1, the radio communication system is a communication system based on a cellular mobile communication technology, and this radio communication system may include several terminals 11 and several base stations 12.

The terminal 11 may refer to a device that provides voice and/or data connectivity for a user. The terminal 11 may be in communication with one or more core networks by means of a radio access network (RAN), and the terminal 11 may be an internet of things terminal, such as a sensor device, a mobile phone (or referred to as a "cellular" phone), and a computer with an internet of things terminal, such as a stationary, portable, pocket-sized or hand-held apparatus, an apparatus built in a computer, or a vehicle-mounted apparatus, such as a station (STA), a subscriber unit, a subscriber station, a mobile station, a mobile, a remote station, an access point, a remote terminal, an access terminal, a user device, a user agent, user equipment (UE), or a user terminal. The terminal 11 may be a device of an unmanned aerial vehicle. The terminal 11 may be a vehicle-mounted device, such as an on-board computer having a radio communication function, or a radio communication device externally connected to an on-board computer. The terminal 11 may be a roadside device, such as a street lamp, a signal lamp or other roadside devices having a radio communication function.

The base station 12 may be a network-side device in a radio communication system. This radio communication system may be the 4th generation mobile communication (4G) system, which is also referred to as a long term evolution (LTE) system. This radio communication system may be a 5G system, which is also referred to as a new radio (NR) system or a 5G NR system. This radio communication system may be a next generation system after the 5G system. An access network of the 5G system may be referred to as a new generation-radio access network (NG-RAN). The radio communication system may be a machine type communication (MTC) system.

The base station 12 may be an evolved node B (eNB) used in a 4G system. The base station 12 may be a generation node B (gNB) having a central and distributed architecture in a 5G system. In the case that the base station 12 has a central and distributed architecture, the base station generally includes a central unit (CU) and at least two distributed units (DUs). The central unit is provided with protocol stacks of a packet data convergence protocol (PDCP) layer, a radio link control (RLC) layer and a media access control (MAC) layer. The distributed unit is provided with a protocol stack of a physical (PHY) layer. A specific implementation mode of the base station 12 is not limited in an example of the disclosure.

The base station 12 may be in wireless connection with the terminal 11 by means of a wireless air interface. In different embodiments, this wireless air interface may be a wireless air interface based on 4G. This wireless air interface may be a wireless air interface based on 5G, for example, this wireless air interface is a new radio. This wireless air interface may be a wireless air interface based on next generation mobile communication of 5G.

In some examples, the terminals 11 may be in connection with each other in an end to end (E2E) mode, such as vehicle to vehicle (V2V) communication, vehicle to infrastructure (V2I) communication and vehicle to pedestrian (V2P) communication in vehicle to everything (V2X) communication.

In some examples, the above radio communication system may further include a network management device 13.

The several base stations 12 are connected to the network management device 13. The network management device 13 may be a core network device in a radio communication system, for example, this network management device 13 may be a mobility management entity (MME) in an evolved packet core (EPC). This network management device may be other core network devices, such as a serving gateway (SGW), a public data network gateway (PGW), a policy and charging rules function (PCRF) or a home subscriber server (HSS). An implementation form of the network management device 13 is not limited in an example of the disclosure.

An execution subject involved in an example of the disclosure includes, but is not limited to, UE such as a mobile phone terminal supporting cellular mobile communication and a base station.

An application scenario of an example of the disclosure is that the base station is configured with signal configuration indicating a transmission resource of a tracking reference signal (TRS) and/or a channel state information reference signal (CSI-RS), and indicates whether signal configuration is validated by means of a validation indication. If the validation indication indicates that the signal configuration is validated, the UE may receive the TRS and/or the CSI-RS based on signal configuration. If the validation indication indicates that the signal configuration is not validated, the UE stops monitoring the TRS and/or the CSI-RS.

If the base station is configured with signal configuration, does not transmit the TRS and/or the CSI-RS, and does not transmit the validation indication for a long time, the UE is required to keep carrying out blind detection. If no signal is detected, the UE is required to carry out synchronization by means of a synchronization signal block (SSB), and the number of the SSB used for synchronization does not decrease, which cannot save power and even consumes more power.

If the base station is configured with signal configuration, and transmits the validation indication no matter the TRS and/or the CSI-RS is transmitted or not, a high power consumption requirement is provided for a network side, and inflexibility is shown. Thus, how to flexibly use the validation indication to indicate whether signal configuration is validated, and how to carry out blind detection, so as to improve detection efficiency of the TRS and/or the CSI-RS, and reduce power consumption are problems to be urgently solved.

Figure 2:
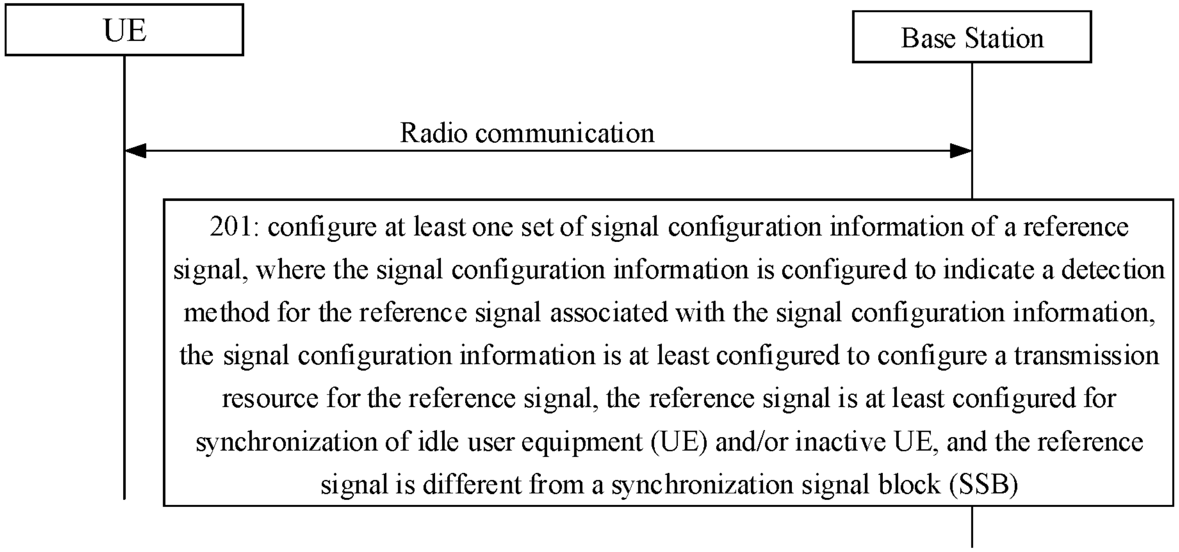
FIG. 2 is a schematic flow diagram of a method for configuring a signal shown according to an example.

As shown in FIG. 2, the example provides a method for configuring a signal. The method for configuring a signal may be performed by a base station of a cellular mobile communication system, and includes:

Step 201: configure at least one set of signal configuration information of a reference signal, where signal configuration information is configured to indicate a detection method for the reference signal associated with the signal configuration information, the signal configuration information is at least configured to configure a transmission resource for the reference signal, the reference signal is at least configured for synchronization of idle UE and/or inactive UE, and the reference signal is different from an SSB.

Here, the UE may be a mobile phone terminal, etc. that carries out radio communication through a cellular mobile communication technology. The base station may be a communication device that provides an access network interface for UE in the cellular mobile communication system. The UE may be idle UE or inactive UE.

The reference signal may be a signal for the UE to carry out downlink synchronization. The signal configuration information may be configured to indicate configuration of the reference signal, such as transmission resource configuration of the reference signal. An association relation between the signal configuration information and the reference signal may include, but is not limited to, a relation that the signal configuration information is configured to indicate signal configuration of this reference signal.

In an example, the reference signal includes:

a TRS and/or a CSI-RS.

Here, the TRS and/or the CSI-RS may be a TRS and/or a CSI-RS shared by idle UE and/or inactive UE and/or connected UE. The idle UE and/or the inactive UE and connected UE may monitor a TRS and/or a CSI-RS at a TRS and/or CSI-RS occasion.

For example, the idle UE and/or the inactive UE may carry out downlink synchronization based on the monitored TRS and/or CSI-RS.

The transmission resource of the TRS and/or the CSI-RS configured by the signal configuration information includes, but is not limited to, a frequency-domain resource, a time-domain resource, and/or a code-domain resource.

The base station generally configures signal configuration information of one set of TRSs and/or CSI-RSs for one connected UE. The base station may transmit the signal configuration information to the connected UE by means of dedicated signaling. Thus, when one or more connected UE access, the base station may configure signal configuration information of one or more sets of TRSs and/or CSI-RSs. In a case that the TRS and/or the CSI-RS may be shared by the idle UE and/or the inactive UE, the base station may configure signal configuration information of one or more sets of TRSs and/or CSI-RSs configured for the connected UE to the idle UE and/or the inactive UE for use.

In an example, the method further includes: transmit the signal configuration information.

The base station may transmit the indication information to the idle UE and/or the inactive UE through a unicast method. After receiving the indication information, the idle UE and/or the inactive UE may determine signal configuration information of one or more sets of TRSs and/or CSI-RS s.

For example, the base station may carry signal configuration information of one or more sets of TRSs and/or CSI-RSs in a system message and broadcast same to the idle UE and/or the inactive UE.

The idle UE and/or the inactive UE may determine a method for detecting a TRS and/or a CSI-RS based on the signal configuration information. For example, if the signal configuration information is validated based on the validation indication, after receiving the validation indication validating this signal configuration information, the UE may detect a TRS and/or a CSI-RS on a transmission resource configured by the signal configuration information. The UE may further detect a TRS and/or a CSI-RS, etc. through the blind detection.

In this way, the base station is configured with at least one set of signal configuration information of a reference signal. On the one hand, the base station may provide signal configuration information associated with a plurality of sets of reference signals respectively for the idle UE and/or the inactive UE for selection, so as to improve flexibility of the UE in selecting the reference signal. On the other hand, the signal configuration information may be configured to indicate a method in which the UE detects the reference signal, so as to reduce the situation that since the UE selects a wrong detection method, detection fails, and improve detection efficiency.

In an example, a state of detection configuration information of the signal configuration information is configured to indicate the detection method for the reference signal associated with the signal configuration information.

The detection configuration information may be information for indicating a detection method, or information for indicating that a reference signal is associated with a detection resource.

The state of the detection configuration information may be a state of whether the detection configuration information exists, or a state of whether the detection configuration information is validated.

The base station may set different states of detection configuration information for the UE to determine detection of a TRS and/or a CSI-RS.

In an example, the detection configuration information includes:

blind detection configuration information for the UE to carry out blind detection on the reference signal, where the blind detection configuration information is configured to indicate the number of groups of blind detection carried out by the UE on the reference signal.

Here, the detection configuration information may be blind detection configuration information. The blind detection configuration information may include, but is not limited to, a resource for the UE to carry out blind detection on the TRS and/or the CSI-RS, and/or a condition for the UE to carry out blind detection on the TRS and/or the CSI-RS.

The state of the blind detection configuration information may include: a state of whether the blind detection configuration information is in a validated state, a state of whether the blind detection configuration information exists, etc.

Detection by the UE on the TRS and/or the CSI-RS may at least include detection on the TRS and/or the CSI-RS by means of a transmission resource, and/or blind detection on the TRS and/or the CSI-RS.

The UE may determine a method for detecting the TRS and/or the CSI-RS based on the state of the blind detection configuration information, instead of detecting the TRS and/or the CSI-RS on the transmission resource only according to whether the signal configuration information is validated.

For example, the UE may determine whether to carry out blind detection based on the state of the blind detection configuration information, and/or carry out blind detection when a condition for blind detection is satisfied.

In this way, detection for the TRS and/or the CSI-RS is determined based on the state of the blind detection configuration information, and the UE selects the detection method not only based on whether the signal configuration information is validated, which improves flexibility of the UE in selecting the detection method for the TRS and/or the CSI-RS.

In response to determining that the signal configuration has blind detection configuration information, that is, the base station sets a blind detection resource or a condition for blind detection for the TRS and/or the CSI-RS, the UE may carry out blind detection on the TRS and/or the CSI-RS based on the blind detection resource or the condition for blind detection.

For example, the base station may transmit the TRS and/or the CSI-RS based on the transmission resource configured by the signal configuration information. The base station may suspend transmission of the TRS and/or the CSI-RS without notifying the idle UE and/or the inactive UE based on a load condition, power saving, etc. The base station may further restore transmission of the TRS and/or the CSI-RS without notifying the UE. If the signal configuration information includes blind detection configuration information, the UE may carry out blind detection on the TRS and/or the CSI-RS. Thus, the TRS and/or the CSI-RS may be detected when the base station restores transmission of the TRS and/or the CSI-RS.

The base station may further carry out a validation setting for the signal configuration information. The base station may indicate to the UE whether the signal configuration information is validated by means of the validation indication. When the signal configuration information is in a validated state, it is indicated that the transmission resource configured by the signal configuration information reasonably exists, and the base station actually transmits the TRS and/or the CSI-RS corresponding to the transmission resource. In this case, the reference signal is available for the UE, and the network side expects the UE to use the reference signal. When the signal configuration information is in a non-validated state, it is indicated that the transmission resource configured by the signal configuration information may unreasonably exist, or the transmission resource configured by the signal configuration information may reasonably exist, but the network side does not use this transmission resource to transmit the TRS and/or the CSI-RS. When the signal configuration information is in the non-validated state, the reference signal transmitted by this transmission resource is unavailable for the UE, and the network side does not expect the UE to use the reference signal.

In response to determining that the signal configuration information does not have blind detection configuration information, the UE may detect the TRS and/or the CSI-RS based on the validation indication. If the validation indication indicates that the signal configuration information is validated, the UE may detect a TRS and/or a CSI-RS by means of a transmission resource configured by the signal configuration information.

In response to determining that the signal configuration information has blind detection configuration information, the UE may further detect a TRS and/or a CSI-RS based on the validation indication. If the validation indication indicates that the signal configuration information is validated, the UE may detect a TRS and/or a CSI-RS by means of a transmission resource configured by the signal configuration information.

In response to at least two sets of signal configuration information, the UE carries out blind detection on a TRS and/or a CSI-RS having blind detection configuration information of the signal configuration information.

In response to at least two sets of signal configuration information, the UE detects, based on the validation indication, a TRS and/or a CSI-RS not having blind detection configuration information of the signal configuration information.

The base station may configure a plurality of sets of TRSs and/or CSI-RSs, and one set of TRSs and/or CSI-RSs may be associated with one piece of signal configuration information. The signal configuration information of different TRSs and/or CSI-RSs may be the same or different.

If one set of signal configuration information does not have blind detection configuration information, the UE detects, based on the validation indication, a TRS and/or a CSI-RS associated with this set of signal configuration information.

If one set of signal configuration information has blind detection configuration information, the UE may carry out blind detection on a TRS and/or a CSI-RS associated with this set of signal configuration information based on the blind detection configuration information.

In an example, the method further includes:

determine by UE that the reference signal is detected through the blind detection, and carry out synchronization by means of the reference signal; and determine by UE that no reference signal is detected through the blind detection, and carry out synchronization by means of the SSB.

If UE detects a TRS and/or a CSI-RS through the blind detection, the UE may determine that the base station starts to transmit the TRS and/or the CSI-RS, and the UE may carry out downlink synchronization based on the TRS and/or the CSI-RS, thus saving power.

If the UE does not detect a TRS and/or a CSI-RS through the blind detection, in order to maintain synchronization with the base station, the UE may carry out downlink synchronization by means of an SSB, thus maintaining communication with the base station.

In an example, the UE carries out blind detection on the TRS and/or the CSI-RS after a last discontinuous reception (DRX) period in which the TRS and/or the CSI-RS is received based on the configuration information.

The blind detection configuration information may include a condition for the UE to carry out blind detection and/or a parameter for blind detection.

The condition for the UE to carry out blind detection may be as follows: when the UE detects no TRS and/or CSI-RS on a transmission resource, blind detection is carried out.

The parameter for blind detection may include duration, a frequency and the number of blind detection, and the number of groups of blind detection.

Here, one group of the blind detection may include one or more times of blind detection. A predetermined number of groups of blind detection may include one or more groups of blind detection.

For example, the base station transmits the TRS and/or the CSI-RS when connected to connected UE, and the TRS and/or the CSI-RS may be configured for synchronization of idle UE and/or inactive UE. When the connected UE leaves a signal coverage area of the base station, the base station may stop transmitting the TRS and/or the CSI-RS. When the connected UE restores accessing the base station, the base station may retransmit the TRS and/or the CSI-RS. The base station may suspend or start transmission of the TRS and/or the CSI-RS without transmitting the validation indication. Since the idle UE and/or the inactive UE does not receive an indication indicating that the signal configuration information is invalidated, a predetermined number of groups of blind detection may be carried out, so as to determine whether the TRS and/or the CSI-RS exists.

The predetermined number of groups may be set according to an actual situation, so as to reduce power consumption of the UE due to blind detection.

In an example, the blind detection configuration information is further configured to indicate:

duration of each group of the blind detection; or a number N of times of blind detection in each group of the blind detection, where N is a positive integer.

One group of the blind detection may include one or more times of blind detection. Each group of the blind detection may last for predetermined blind detection duration.

For example, the UE may set a timer, and duration of the timer is predetermined blind detection duration t1. In the case of timeout of the timer, one group of the blind detection ends. The UE may stop blind detection, or may carry out a next group of blind detection.

The UE may further preset a number N of times of blind detection in one group of the blind detection. During blind detection, the UE may set a counter. When a count of the counter exceeds N, blind detection is stopped, or a next group of blind detection is carried out.

In this way, according to the number of groups of blind detection, the predetermined blind detection duration, and the number of times of blind detection in each group of the blind detection, the total number of blind detection is controlled, so as to control power consumption of the UE.

In an example, the blind detection configuration information is further configured to indicate that a blind detection frequency of a first group of the blind detection is higher than a blind detection frequency of a second group of the blind detection, where the first group of the blind detection is before the second group of the blind detection.

The blind detection configuration information may be configured to configure a frequency at which the UE carries out blind detection. The blind detection configuration information may configure the UE to carry out a next group of blind detection at a sparser frequency after one group of the blind detection ends. As time goes on, the probability that the base station restores transmission of the TRS and/or the CSI-RS without transmitting the validation indication is less and less. Thus, blind detection may be carried out by reducing a blind detection frequency. On the one hand, power consumption of the UE may be reduced. On the other hand, blind detection is still maintained, and a probability of missing detection of a TRS and/or a CSI-RS is reduced.

In an example, the blind detection configuration information is further configured to indicate that the blind detection frequency of the second group of the blind detection is 1/M of the blind detection frequency of the first group of the blind detection, where M is a positive integer.

A frequency at which the UE carries out a next group of blind detection may be 1/M of a frequency at which the UE carries out a previous group of blind detection. Thus, based on maintaining blind detection, power consumption is reduced.

In an example, the method further includes:

determine that connected UE associated with the reference signal is not connected to the base station, where the signal configuration information of the reference signal has the blind detection configuration information, stop transmitting the reference signal within predetermined duration.

The shared TRS and/or CSI-RS is configured for connected UE. When the connected UE associated with the TRS and/or the CSI-RS leaves the base station due to movement or other reasons, the base station may stop transmitting the TRS and/or the CSI-RS within predetermined duration. In this way, power of the base station can be saved. The UE may carry out blind detection within predetermined duration.

In an example, the method further includes:

determine that the reference signal is transmitted after the predetermined duration, and transmit a validation indication indicating that the signal configuration information is validated.

After suspending transmission of the TRS and/or the CSI-RS, the base station may indicate that the signal configuration information is revalidated by means of the validation indication, and retransmit the TRS and/or the CSI-RS on the transmission resource configured by the signal configuration information. After receiving the validation indication indicating that the signal configuration information is validated, the UE receives the TRS and/or the CSI-RS by means of the transmission resource.

In this way, it is explicitly indicated that the UE detects a TRS and/or a CSI-RS. Invalidated blind detection is reduced, and detection efficiency of the TRS and/or the CSI-RS is improved.

Figure 3:
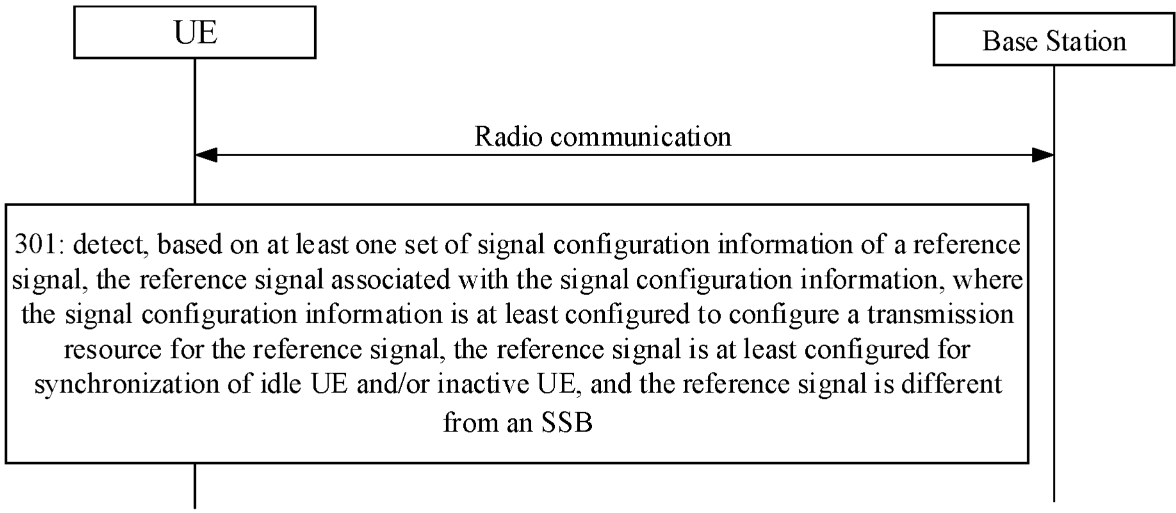
FIG. 3 is a schematic flow diagram of a method for detecting a signal shown according to an example.

As shown in FIG. 3, the example provides a method for detecting a signal. The method for detecting a signal is performed by UE, and includes:

step 301: detect, based on at least one set of signal configuration information of a reference signal, a reference signal associated with the signal configuration information, where the signal configuration information is at least configured to configure a transmission resource for the reference signal, the reference signal is at least configured for synchronization of idle UE and/or inactive UE, and the reference signal is different from an SSB.

Here, the UE may be a mobile phone terminal, etc. that carries out radio communication through a cellular mobile communication technology. The base station may be a communication device that provides an access network interface for UE in a cellular mobile communication system. The UE may be idle UE or inactive UE.

The reference signal may be a signal for the UE to carry out downlink synchronization. The signal configuration information may be configured to indicate configuration of the reference signal, such as transmission resource configuration of the reference signal. An association relation between the signal configuration information and the reference signal may include, but is not limited to, a relation that the signal configuration information is configured to indicate signal configuration of this reference signal.

In an example, the reference signal includes:

a TRS and/or a CSI-RS.

Here, the TRS and/or the CSI-RS may be a TRS and/or a CSI-RS shared by idle UE and/or inactive UE and/or connected UE. The idle UE and/or the inactive UE and connected UE may monitor a TRS and/or a CSI-RS at a TRS and/or CSI-RS occasion.

For example, the idle UE and/or the inactive UE may carry out downlink synchronization based on the monitored TRS and/or CSI-RS.

The transmission resource of the TRS and/or the CSI-RS configured by the signal configuration information includes, but is not limited to, a frequency-domain resource, a time-domain resource, and/or a code-domain resource.

The base station generally configures signal configuration information of one set of TRSs and/or CSI-RSs for one connected UE. The base station may transmit the signal configuration information to the connected UE by means of dedicated signaling. Thus, when one or more connected UE access, the base station may configure signal configuration information of one or more sets of TRSs and/or CSI-RSs. In a case that the TRS and/or the CSI-RS may be shared by the idle UE and/or the inactive UE, the base station may configure signal configuration information of one or more sets of TRSs and/or CSI-RSs configured for the connected UE to the idle UE and/or the inactive UE for use.

In an example, the method further includes: receive the signal configuration information transmitted by the base station.

The base station may transmit the indication information to the idle UE and/or the inactive UE through a unicast method. After receiving the indication information, the idle UE and/or the inactive UE may determine signal configuration information of one or more sets of TRSs and/or CSI-RS s.

For example, the base station may carry signal configuration information of one or more sets of TRSs and/or CSI-RSs in a system message and broadcast same to the idle UE and/or the inactive UE.

The idle UE and/or the inactive UE may determine a method for detecting a TRS and/or a CSI-RS based on the signal configuration information. For example, if the signal configuration information is validated based on the validation indication, after receiving the validation indication validating this signal configuration information, the UE may detect a TRS and/or a CSI-RS on a transmission resource configured by the signal configuration information. The UE may further detect a TRS and/or a CSI-RS, etc. through the blind detection.

In this way, the base station is configured with at least one set of signal configuration information of a reference signal. On the one hand, the base station may provide signal configuration information associated with a plurality of sets of reference signals respectively for the idle UE and/or the inactive UE for selection, so as to improve flexibility of the UE in selecting the reference signal. On the other hand, the signal configuration information may be configured to indicate a method in which the UE detects the reference signal, so as to reduce the situation that since the UE selects a wrong detection method, detection fails, and improve detection efficiency.

In an example, the step of detecting, based on at least one set of signal configuration information of a reference signal, a reference signal associated with the signal configuration information includes:

detect, based on a state of detection configuration information of the signal configuration information, the reference signal associated with the signal configuration information.

The detection configuration information may be information for indicating a detection method, or information for indicating that a reference signal is associated with a detection resource.

The state of the detection configuration information may be a state of whether the detection configuration information exists, or a state of whether the detection configuration information is validated.

The base station may set different states of detection configuration information for the UE to determine detection of a TRS and/or a CSI-RS.

In an example, the detection configuration information includes blind detection configuration information; and the step of detecting, based on a state of detection configuration information of the signal configuration information, the reference signal associated with the signal configuration information includes at least one of operations as follows:

carry out, in response to determining that the signal configuration information has the blind detection configuration information, based on the blind detection configuration information, blind detection on the reference signal associated with the signal configuration information; or detect, in response to determining that the signal configuration information has the blind detection configuration information or does not have the blind detection configuration information, based on a validation indication, the reference signal associated with the signal configuration information, where the validation indication is configured to indicate whether the signal configuration information is validated.

Here, the detection configuration information may be blind detection configuration information. The blind detection configuration information may include, but is not limited to, a resource for the UE to carry out blind detection on the TRS and/or the CSI-RS, and/or a condition for the UE to carry out blind detection on the TRS and/or the CSI-RS.

The state of the blind detection configuration information may include: a state of whether the blind detection configuration information is in a validated state, a state of whether the blind detection configuration information exists, etc.

Detection by the UE on the TRS and/or the CSI-RS may at least include detection on the TRS and/or the CSI-RS by means of a transmission resource, and/or blind detection on the TRS and/or the CSI-RS.

The UE may determine a method for detecting the TRS and/or the CSI-RS based on the state of the blind detection configuration information, instead of detecting the TRS and/or the CSI-RS on the transmission resource only according to whether the signal configuration information is validated.

For example, the UE may determine whether to carry out blind detection based on the state of the blind detection configuration information, and/or carry out blind detection when a condition for blind detection is satisfied.

In this way, detection for the TRS and/or the CSI-RS is determined based on the state of the blind detection configuration information, and the UE selects the detection method not only based on whether the signal configuration information is validated, which improves flexibility of the UE in selecting the detection method for the TRS and/or the CSI-RS.

In response to determining that the signal configuration has blind detection configuration information, that is, the base station sets a blind detection resource or a condition for blind detection for the TRS and/or the CSI-RS, the UE may carry out blind detection on the TRS and/or the CSI-RS based on the blind detection resource or the condition for blind detection.

For example, the base station may transmit the TRS and/or the CSI-RS based on the transmission resource configured by the signal configuration information. The base station may suspend transmission of the TRS and/or the CSI-RS without notifying the idle UE and/or the inactive UE based on a load condition, power saving, etc. The base station may further restore transmission of the TRS and/or the CSI-RS without notifying the UE. If the signal configuration information includes blind detection configuration information, the UE may carry out blind detection on the TRS and/or the CSI-RS. Thus, the TRS and/or the CSI-RS may be detected when the base station restores transmission of the TRS and/or the CSI-RS.

The base station may further carry out a validation setting for the signal configuration information. The base station may indicate to the UE whether the signal configuration information is validated by means of the validation indication. When the signal configuration information is in a validated state, it is indicated that the transmission resource configured by the signal configuration information reasonably exists, and the base station actually transmits the TRS and/or the CSI-RS corresponding to the transmission resource. In this case, the reference signal is available for the UE, and the network side expects the UE to use the reference signal. When the signal configuration information is in a non-validated state, it is indicated that the transmission resource configured by the signal configuration information may unreasonably exist, or the transmission resource configured by the signal configuration information may reasonably exist, but the network side does not use this transmission resource to transmit the TRS and/or the CSI-RS. When the signal configuration information is in the non-validated state, the reference signal transmitted by this transmission resource is unavailable for the UE, and the network side does not expect the UE to use the reference signal.

In response to determining that the signal configuration information does not have blind detection configuration information, the UE may detect the TRS and/or the CSI-RS based on the validation indication. If the validation indication indicates that the signal configuration information is validated, the UE may detect a TRS and/or a CSI-RS by means of a transmission resource configured by the signal configuration information.

In response to determining that the signal configuration information has blind detection configuration information, the UE may further detect a TRS and/or a CSI-RS based on the validation indication. If the validation indication indicates that the signal configuration information is validated, the UE may detect a TRS and/or a CSI-RS by means of a transmission resource configured by the signal configuration information.

In response to at least two sets of signal configuration information, the UE carries out blind detection on a TRS and/or a CSI-RS having blind detection configuration information of the signal configuration information.

In response to at least two sets of signal configuration information, the UE detects, based on the validation indication, a TRS and/or a CSI-RS not having blind detection configuration information of the signal configuration information.

The base station may configure a plurality of sets of TRSs and/or CSI-RSs, and one set of TRSs and/or CSI-RSs may be associated with one piece of signal configuration information. The signal configuration information of different TRSs and/or CSI-RSs may be the same or different.

If one set of signal configuration information does not have blind detection configuration information, the UE detects, based on the validation indication, a TRS and/or a CSI-RS associated with this set of signal configuration information.

If one set of signal configuration information has blind detection configuration information, the UE may carry out blind detection on a TRS and/or a CSI-RS associated with this set of signal configuration information based on the blind detection configuration information.

In an example, the method further includes:

determine by UE that the reference signal is detected through the blind detection, and carry out synchronization by means of the reference signal; and determine by UE that no reference signal is detected through the blind detection, and carry out synchronization by means of the SSB.

If UE detects a TRS and/or a CSI-RS through the blind detection, the UE may determine that the base station starts to transmit the TRS and/or the CSI-RS, and the UE may carry out downlink synchronization based on the TRS and/or the CSI-RS, thus saving power.

If the UE does not detect a TRS and/or a CSI-RS through the blind detection, in order to maintain synchronization with the base station, the UE may carry out downlink synchronization by means of an SSB, thus maintaining communication with the base station.

In an example, the step of carrying out, based on the blind detection configuration information, blind detection on the reference signal associated with the signal configuration information includes:

carry out blind detection on the reference signal after a last DRX period in which the reference signal is received based on a transmission resource configured by the signal configuration information.

The blind detection configuration information may include a condition for the UE to carry out blind detection and/or a parameter for blind detection.

The condition for the UE to carry out blind detection may be as follows: when the UE detects no TRS and/or CSI-RS on a transmission resource, blind detection is carried out.

In an example, the method further includes:

determine the number of groups of blind detection according to the blind detection configuration information.

The parameter for blind detection may include duration, a frequency and the number of blind detection, and the number of groups of blind detection.

Here, one group of the blind detection may include one or more times of blind detection. A predetermined number of groups of blind detection may include one or more groups of blind detection.

For example, the base station transmits the TRS and/or the CSI-RS when connected to connected UE, and the TRS and/or the CSI-RS may be configured for synchronization of idle UE and/or inactive UE. When the connected UE leaves a signal coverage area of the base station, the base station may stop transmitting the TRS and/or the CSI-RS. When the connected UE restores accessing the base station, the base station may retransmit the TRS and/or the CSI-RS. The base station may suspend or start transmission of the TRS and/or the CSI-RS without transmitting the validation indication. Since the idle UE and/or the inactive UE does not receive an indication indicating that the signal configuration information is invalidated, a predetermined number of groups of blind detection may be carried out, so as to determine whether the TRS and/or the CSI-RS exists.

The predetermined number of groups may be set according to an actual situation, so as to reduce power consumption of the UE due to blind detection.

In an example, the method further includes:

determine duration of each group of the blind detection according to the blind detection configuration information; or determine a number N of times of blind detection in each group of the blind detection according to the blind detection configuration information, where N is a positive integer.

One group of the blind detection may include one or more times of blind detection. Each group of the blind detection may last for predetermined blind detection duration.

For example, the UE may set a timer, and duration of the timer is predetermined blind detection duration t1. In the case of timeout of the timer, one group of the blind detection ends. The UE may stop blind detection, or may carry out a next group of blind detection.

The UE may further preset a number N of times of blind detection in one group of the blind detection. During blind detection, the UE may set a counter. When a count of the counter exceeds N, blind detection is stopped, or a next group of blind detection is carried out.

In this way, according to the number of groups of blind detection, the predetermined blind detection duration, and the number of times of blind detection in each group of the blind detection, a total number of blind detection is controlled, so as to control power consumption of the UE.

In an example, the step of carrying out, based on the blind detection configuration information, blind detection on the reference signal associated with the signal configuration information includes:

carry out a second group of the blind detection in response to determining that a first group of the blind detection does not detect the reference signal, where a blind detection frequency of the second group of the blind detection is lower than a blind detection frequency of the first group of the blind detection.

The blind detection configuration information may be configured to configure a frequency at which the UE carries out blind detection. The blind detection configuration information may configure the UE to carry out a next group of blind detection at a sparser frequency after one group of the blind detection ends. As time goes on, the probability that the base station restores transmission of the TRS and/or the CSI-RS without transmitting the validation indication is less and less. Thus, blind detection may be carried out by reducing a blind detection frequency. On the one hand, power consumption of the UE may be reduced. On the other hand, blind detection is still maintained, and a probability of missing detection of a TRS and/or a CSI-RS is reduced.

In an example, the blind detection frequency of the second group of the blind detection is 1/M of the blind detection frequency of the first group of the blind detection, where M is a positive integer.

A frequency at which the UE carries out a next group of blind detection may be 1/M of a frequency at which the UE carries out a previous group of blind detection. Thus, based on maintaining blind detection, power consumption is reduced.

In an example, the method further includes:

determine that the validation indication indicating that the signal configuration information is validated is received, and receive the reference signal based on the transmission resource configured by the signal configuration information.

The shared TRS and/or CSI-RS is configured for connected UE. When the connected UE associated with the TRS and/or the CSI-RS leaves the base station due to movement or other reasons, the base station may stop transmitting the TRS and/or the CSI-RS within predetermined duration. In this way, power of the base station can be saved. The UE may carry out blind detection within predetermined duration.

After suspending transmission of the TRS and/or the CSI-RS, the base station may indicate that the signal configuration information is revalidated by means of the validation indication, and retransmit the TRS and/or the CSI-RS on the transmission resource configured by the signal configuration information. After receiving the validation indication indicating that the signal configuration information is validated, the UE receives the TRS and/or the CSI-RS by means of the transmission resource.

In this way, it is explicitly indicated that the UE detects a TRS and/or a CSI-RS. Invalidated blind detection is reduced, and detection efficiency of the TRS and/or the CSI-RS is improved.

A particular instance is provided below in combination with any of the above examples:

1. The base station is configured with signal configuration information of a TRS/CSI-RS for synchronization of idle/inactive UE, and is also configured with blind detection configuration information for the UE to carry out blind detection on the TRS/CSI-RS.
2. The blind detection configuration information for the UE to carry out blind detection on the TRS/CSI-RS refers to a method that the UE considers, under a specified condition, that the base station is not configured with the validation indication and then carries out blind detection on a TRS/CSI-RS.
3. According to the above, the specific condition refers to a condition that in a case that idle/inactive UE in a previous DRX period monitors that the base station transmits a TRS/CSI-RS for synchronization, and the base station stops transmitting the reference signal in a next period, the UE continues to carry out detection for time t1, after t1 is over, or counter n1 is transmitted, after n1 is 0, the UE considers that the base station stops transmitting the TRS/CSI-RS, and uses a synchronization solution without a TRS/CSI-RS, that is, more than one SSB, generally three SSBs, are monitored.
4. After that, if the base station transmits this reference signal again, an indication should be transmitted explicitly to inform the UE.
5. The base station may be also configured with configuration that the UE carries out blind monitoring at a sparser frequency after timing/counting timeout, for example, the frequency is reduced to 1/n of an original frequency.
6. If the UE detects a TRS/CSI-RS again, it is indicated that the base station transmits the TRS/CSI-RS here. The UE may use this TRS/CSI-RS for synchronization from a current moment, so as to change a strategy for detecting an SSB.
7. The idle/inactive UE determines whether to carry out blind detection on the TRS/CSI-RS according to the above configuration of the base station. If no TRS/CSI-RS is detected, it is considered that the base station does not transmit the TRS/CSI-RS. If a TRS/CSI-RS is detected, it is considered that the base station transmits the TRS/CSI-RS.

Figure 4:
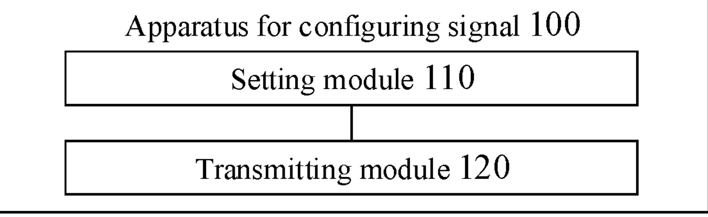
FIG. 4 is a block diagram of an apparatus for configuring a signal shown according to an example.

An example of the disclosure further provides an apparatus for configuring a signal. The apparatus for configuring a signal is applied in a base station for radio communication. As shown in FIG. 4, the apparatus 100 for configuring a signal includes: a setting module 110 configured to configure at least one set of signal configuration information of a reference signal, where signal configuration information is configured to indicate a detection method for the reference signal associated with the signal configuration information, the signal configuration information is at least configured to configure a transmission resource for the reference signal, the reference signal is at least configured for synchronization of idle UE and inactive UE, and the reference signal is different from an SSB.

In an example, a state of detection configuration information of the signal configuration information is configured to indicate the detection method for the reference signal associated with the signal configuration information.

In an example, the detection configuration information includes:

blind detection configuration information for the UE to carry out blind detection on the reference signal, where the blind detection configuration information is configured to indicate the number of groups of blind detection carried out by the UE on the reference signal.

In an example, the blind detection configuration information is further configured to indicate:

duration of each group of the blind detection; or a number N of times of blind detection in each group of the blind detection, where N is a positive integer.

In an example, the blind detection configuration information is further configured to indicate that a blind detection frequency of a first group of the blind detection is higher than a blind detection frequency of a second group of the blind detection, where the first group of the blind detection is before the second group of the blind detection.

In an example, the blind detection configuration information is further configured to indicate that the blind detection frequency of the second group of the blind detection is 1/M of the blind detection frequency of the first group of the blind detection, where M is a positive integer.

In an example, the apparatus further includes:

a transmitting module 120 configured to determine that connected UE associated with the reference signal is not connected to the base station, and the signal configuration information of the reference signal has the blind detection configuration information, and the transmitting module is further configured to stop transmitting the reference signal within predetermined duration.

In an example, the transmitting module 120 is further configured to determine that the reference signal is transmitted after the predetermined duration, and transmit a validation indication indicating that the signal configuration information is validated.

In an example, the transmitting module 120 is further configured to transmit the signal configuration information.

In an example, the reference signal includes:

a TRS and/or a CSI-RS.

Figure 5:
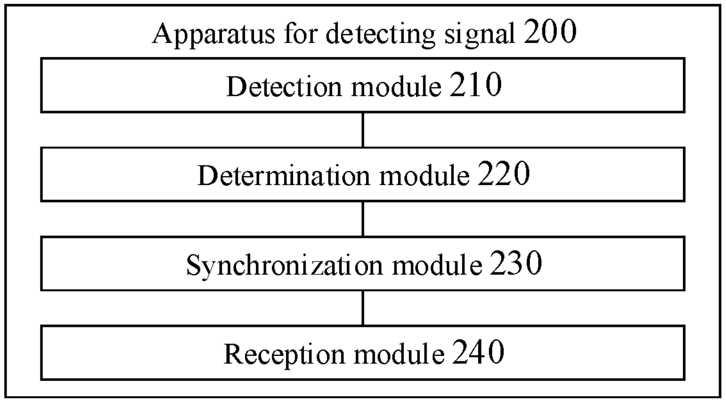
FIG. 5 is a block diagram of another apparatus for detecting a signal shown according to an example.

An example of the disclosure further provides an apparatus for detecting a signal. The apparatus is applied in idle UE and/or inactive UE for radio communication. As shown in FIG. 5, the apparatus 200 for detecting a signal includes: a detection module 210 configured to detect, based on at least one set of signal configuration information of a reference signal, the reference signal associated with the signal configuration information, where the signal configuration information is at least configured to configure a transmission resource for the reference signal, the reference signal is at least configured for synchronization of idle UE and/or inactive UE, and the reference signal is different from an SSB.

In an example, the detection module 210 is configured to detect, based on a state of detection configuration information of the signal configuration information, the reference signal associated with the signal configuration information.

In an example, the detection configuration information includes blind detection configuration information; and the detection module 210 is further configured to carry out at least one of operations as follows:

carry out, in response to determining that the signal configuration information has the blind detection configuration information, based on the blind detection configuration information, blind detection on the reference signal associated with the signal configuration information; or detect, in response to determining that the signal configuration information has the blind detection configuration information or does not have the blind detection configuration information, based on a validation indication, the reference signal associated with the signal configuration information, where the validation indication is configured to indicate whether the signal configuration information is validated.

In an example, the detection module 210 is further configured to:

carry out blind detection on the reference signal after a last DRX period in which the reference signal is received based on a transmission resource configured by the signal configuration information.

In an example, the apparatus 200 further includes:

a determination module 220 configured to determine the number of groups of blind detection according to the blind detection configuration information.

In an example, the determination module 220 is configured to determine duration of each group of the blind detection according to the blind detection configuration information; or determine a number N of times of blind detection in each group of the blind detection according to the blind detection configuration information, where N is a positive integer.

In an example, the detection module 210 is further configured to:

carry out a second group of the blind detection in response to determining that a first group of the blind detection does not detect the reference signal, where a blind detection frequency of the second group of the blind detection is lower than a blind detection frequency of the first group of the blind detection.

In an example, the blind detection frequency of the second group of the blind detection is 1/M of the blind detection frequency of the first group of the blind detection, where M is a positive integer.

In an example, the detection module 210 is further configured to:

determine that the validation indication indicating that the signal configuration information is validated is received, and receive the reference signal based on the transmission resource configured by the signal configuration information.

In an example, the apparatus 200 further includes:

a synchronization module 230 configured to determine that the reference signal is detected through the blind detection, and carry out synchronization by means of the reference signal; and determine that no reference signal is detected through the blind detection, and carry out synchronization by means of the SSB.

In an example, the apparatus 200 further includes:

a reception module 240 configured to receive the signal configuration information transmitted by the base station.

In an example, the reference signal includes:

a TRS and/or a CSI-RS.

In an example, the setting module 110, the transmitting module 120, the detection module 210, the determination module 220, the synchronization module 230, the reception module 240, etc. may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), FPGAs (field-programmable gate arrays), general-purpose processors, controllers, micro controller units (MCUs), microprocessors, or other electronic components, so as to execute the aforementioned method.

Figure 6:
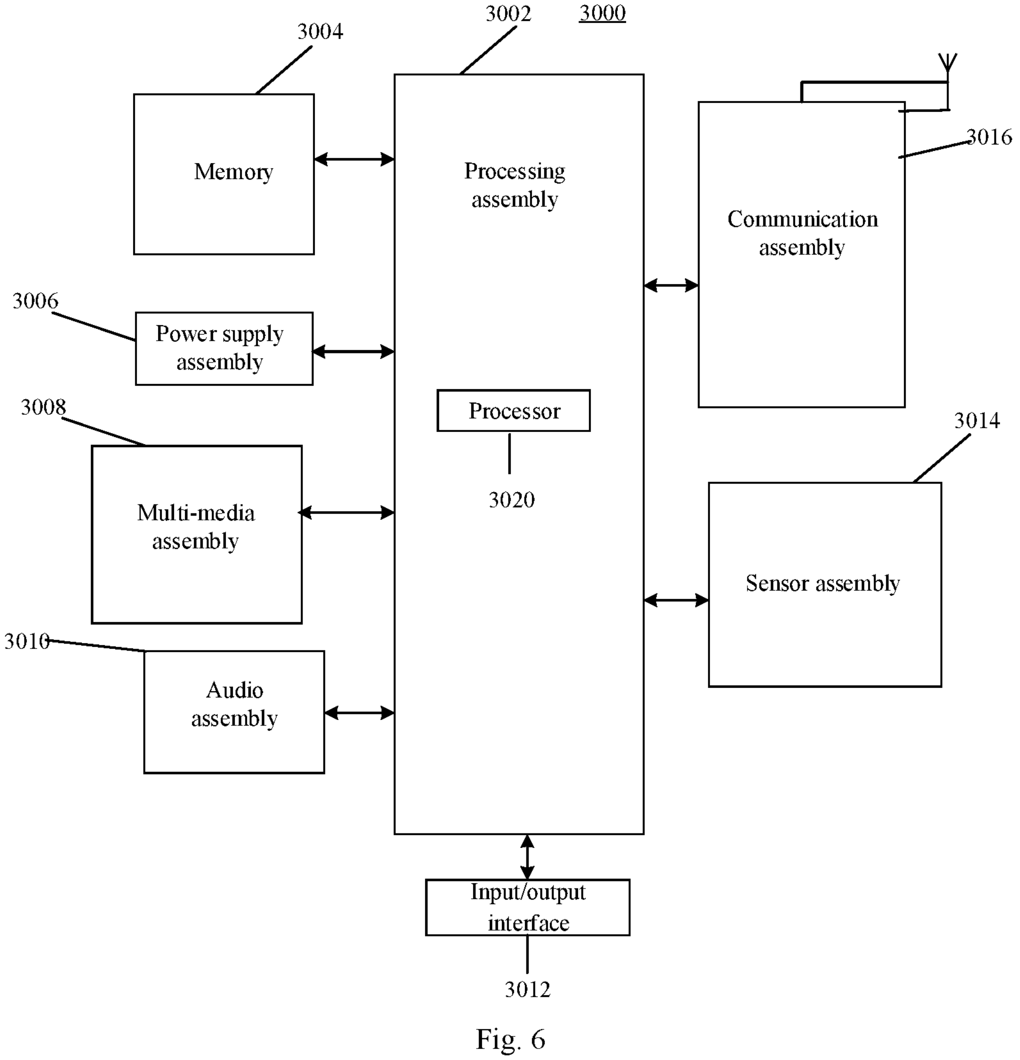
FIG. 6 is a block diagram of an apparatus for transmitting information or detecting a signal shown according to an example.

FIG. 6 is a block diagram of an apparatus 3000 for transmitting information or detecting a signal shown according to an example. For example, the apparatus 3000 may be a mobile phone, a computer, a digital broadcasting terminal, a message receiving and transmitting device, a game console, a tablet device, a medical device, a fitness device, a personal digital assistant, etc.

With reference to FIG. 6, the apparatus 3000 may include one or more of assemblies as follows: a processing assembly 3002, a memory 3004, a power supply assembly 3006, a multi-media assembly 3008, an audio assembly 3010, an input/output (I/O) interface 3012, a sensor assembly 3014 and a communication assembly 3016.

The processing assembly 3002 typically controls overall operation of the apparatus 3000, such as operations associated with display, telephone call, data communication, camera operation and recording. The processing assembly 3002 may include one or more processors 3020 to execute an instruction, so as to complete all steps or some steps of the above method. Further, the processing assembly 3002 may include one or more modules, so as to facilitate interaction between the processing assembly 3002 and other assemblies. For example, the processing assembly 3002 may include a multi-media module, so as to facilitate interaction between the multi-media assembly 3008 and the processing assembly 3002.

The memory 3004 is configured to store various types of data, so as to support an operation at the apparatus 3000. Instances of such data include instructions used for any application or method operating on the apparatus 3000, such as contact data, phonebook data, messages, pictures, videos, etc. The memory 3004 may be implemented by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 3006 provides power for various assemblies of the apparatus 3000. The power supply assembly 3006 may include a power supply management system, one or more power supplies, and other assemblies associated with generation, management and power distribution of the apparatus 3000.

The multi-media assembly 3008 includes a screen that provides an output interface between the apparatus 3000 and a user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors, so as to sense a touch, a swipe and a gesture on the touch panel. The touch sensor may sense not only a boundary of a touch or swipe, but also time and pressure associated with the touch or swipe. In some examples, the multi-media assembly 3008 includes a front-facing camera and/or a rear-facing camera. When the apparatus 3000 is in an operating mode, such as a shooting mode or a video mode, the front-facing camera and/or the rear-facing camera may receive external multi-media data. Each of the front-facing camera and the rear-facing camera may be a fixed optical lens system or have focusing and optical zooming capabilities.

The audio assembly 3010 is configured to output and/or input an audio signal. For example, the audio assembly 3010 may include a microphone (MIC) that is configured to receive an external audio signal when the apparatus 3000 is in an operating method, such as a call mode, a recording mode or a voice recognition mode. The received audio signal may be further stored in the memory 3004 or transmitted by means of the communication assembly 3016. In some examples, the audio assembly 3010 further includes a loudspeaker used for outputting the audio signal.

The I/O interface 3012 provides an interface between the processing assembly 3002 and peripheral interface modules, such as keyboards, click wheels and buttons. These buttons may include, but are not limited to, a home button, a volume button, a start button and a lock button.

The sensor assembly 3014 may include one or more sensors used for providing state assessment of various aspects of the apparatus 3000. For example, the sensor assembly 3014 may detect an open/closed state of the apparatus 3000, and relative positioning of assemblies, for example, a display and keypad of the apparatus 3000. The sensor assembly 3014 may further detect a change in position of the apparatus 3000 or an assembly of the apparatus 3000, presence or absence of contact between a user and the apparatus 3000, orientation or acceleration/deceleration of the apparatus 3000, and a temperature change of the apparatus 3000. The sensor assembly 3014 may include a proximity sensor configured to detect the presence of a nearby object in the absence of any physical contact. The sensor assembly 3014 may further include a light sensor, such as a complementary metal oxide semiconductor (CMOS) or charge coupled device (CCD) image sensor for being used in imaging applications. In some examples, this sensor assembly 3014 may further include an acceleration sensor, a gyroscopic sensor, a magnetic sensor, a pressure sensor, or a temperature sensor.

The communication assembly 3016 is configured to facilitate wired or radio communication between the apparatus 3000 and other devices. The apparatus 3000 may access a wireless network based on a communication standard, such as Wi-Fi, 2G, 3G or their combination. In an example, the communication assembly 3016 receives a broadcast signal or broadcast related information from an external broadcast management system by means of a broadcast channel. In an example, the communication assembly 3016 further includes a near field communication (NFC) module, so as to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic elements, so as to execute the above method.

In an example, a non-transitory computer-readable storage medium including an instruction is further provided, such as a memory 3004 including an instruction. The above instruction may be executed by the processor 3020 of the apparatus 3000, so as to complete the above method. For example, the non-transitory computer-readable storage medium may be a read-only memory (ROM), a random access memory (RAM), a compact disc read-only memory (CD-ROM), a magnetic tape, a floppy disk, an optical data storage device, etc.

A person skilled in the art could easily conceive of other implementation solutions of examples of the disclosure upon consideration of the description and the disclosure disclosed in the implementation. The disclosure is intended to cover any variations, uses or adaptive changes of examples of the disclosure, which follow the general principles of examples of the disclosure and include common general knowledge or customary technical means, which is not disclosed in the disclosure, in the art. The description and examples are to be regarded as illustrative merely, and the true scope and spirit of examples of the disclosure are indicated by the following claims.

It should be understood that examples of the disclosure are not limited to a precise structure that is described above and shown in accompanying drawings, and can have various modifications and changes without departing from the scope of the disclosure. The scope of examples of the disclosure is limited by the appended claims merely.

According to a first aspect of an example of the disclosure, a method for configuring a signal is provided. The method is applied to a base station and includes:

configuring at least one set of signal configuration information of a reference signal, where signal configuration information is configured to indicate a detection method for the reference signal associated with the signal configuration information, the signal configuration information is at least configured to configure a transmission resource for the reference signal, the reference information is at least configured for synchronization of idle user equipment (UE) and/or inactive UE, and the reference signal is different from a synchronization signal block (SSB).

In an example, a state of detection configuration information of the signal configuration information is configured to indicate the detection method for the reference signal associated with the signal configuration information.

In an example, the detection configuration information includes:

blind detection configuration information for the UE to carry out blind detection on the reference signal, where the blind detection configuration information is configured to indicate the number of groups of blind detection carried out by the UE on the reference signal.

In an example, the blind detection configuration information is further configured to indicate:

duration of each group of the blind detection; or a number N of times of blind detection in each group of the blind detection, where N is a positive integer.

In an example, the blind detection configuration information is further configured to indicate that a blind detection frequency of a first group of the blind detection is higher than a blind detection frequency of a second group of the blind detection, where the first group of the blind detection is before the second group of the blind detection.

In an example, the blind detection configuration information is further configured to indicate that the blind detection frequency of the second group of the blind detection is 1/M of the blind detection frequency of the first group of the blind detection, where M is a positive integer.

In an example, the method further includes:

determining that connected UE associated with the reference signal is not connected to the base station, and the signal configuration information of the reference signal has the blind detection configuration information, stopping transmitting the reference signal within predetermined duration.

In an example, the method further includes:

determining that the reference signal is transmitted after the predetermined duration, and transmitting a validation indication indicating that the signal configuration information is validated.

In an example, the method further includes:

transmitting the signal configuration information.

In an example, the reference signal includes:

a tracking reference signal (TRS) and/or a channel state information reference signal (CSI-RS).

According to a second aspect of an example of the disclosure, a method for detecting a signal is provided. The method is applied to UE and includes:

detecting, based on at least one set of signal configuration information of a reference signal, a reference signal associated with the signal configuration information, where the signal configuration information is at least configured to configure a transmission resource for the reference signal, the reference signal is at least configured for synchronization of idle UE and/or inactive UE, and the reference signal is different from an SSB.

In an example, detecting, based on at least one set of signal configuration information of a reference signal, the reference signal associated with the signal configuration information includes:

detecting, based on a state of detection configuration information of the signal configuration information, the reference signal associated with the signal configuration information.

In an example, the detection configuration information includes blind detection configuration information; and determining, based on a state of detection configuration information of the signal configuration information, a detection method for the reference signal associated with the signal configuration information includes at least one of operations as follows:

carrying out, in response to determining that the signal configuration information has the blind detection configuration information, based on the blind detection configuration information, blind detection on the reference signal associated with the signal configuration information; or detecting, in response to determining that the signal configuration information has the blind detection configuration information or does not have the blind detection configuration information, based on a validation indication, the reference signal associated with the signal configuration information, where the validation indication is configured to indicate whether the signal configuration information is validated.

In an example, the carrying out, based on the blind detection configuration information, blind detection on the reference signal associated with the signal configuration information includes:

carrying out blind detection on the reference signal after a last discontinuous reception (DRX) period in which the reference signal is received based on a transmission resource configured by the signal configuration information.

In an example, the method further includes:

determining the number of groups of blind detection according to the blind detection configuration information.

In an example, the method further includes:

determining duration of each group of the blind detection according to the blind detection configuration information; or determining a number N of times of blind detection in each group of the blind detection according to the blind detection configuration information, where N is a positive integer.

In an example, the carrying out, based on the blind detection configuration information, blind detection on the reference signal associated with the signal configuration information includes:

carrying out a second group of the blind detection in response to determining that a first group of the blind detection does not detect the reference signal, where a blind detection frequency of the second group of the blind detection is lower than a blind detection frequency of the first group of the blind detection.

In an example, the blind detection frequency of the second group of the blind detection is 1/M of the blind detection frequency of the first group of the blind detection, where M is a positive integer.

In an example, the method further includes:

determining that the validation indication indicating that the signal configuration information is validated is received, and receiving the reference signal based on the transmission resource configured by the signal configuration information.

In an example, the method further includes:

determining that the reference signal is detected through the blind detection, and carrying out synchronization by means of the reference signal; and determining that no reference signal is detected through the blind detection, and carrying out synchronization by means of the SSB.

In an example, the method further includes:

receiving the signal configuration information transmitted by the base station.

In an example, the reference signal includes:

a TRS and/or a CSI-RS.

According to a third aspect of an example of the disclosure, an apparatus for configuring a signal is provided. The apparatus includes: a setting module configured to configure at least one set of signal configuration information of a reference signal, where signal configuration information is configured to indicate a detection method for the reference signal associated with the signal configuration information, the signal configuration information is at least configured to configure a transmission resource for the reference signal, the reference information is at least configured for synchronization of idle UE and/or inactive UE, and the reference signal is different from an SSB.

In an example, a state of detection configuration information of the signal configuration information is configured to indicate the detection method for the reference signal associated with the signal configuration information.

In an example, the detection configuration information includes:

blind detection configuration information for the UE to carry out blind detection on the reference signal, where the blind detection configuration information is configured to indicate the number of groups of blind detection carried out by the UE on the reference signal.

In an example, the blind detection configuration information is further configured to indicate:

duration of each group of the blind detection; or a number N of times of blind detection in each group of the blind detection, where N is a positive integer.

In an example, the blind detection configuration information is further configured to indicate that a blind detection frequency of a first group of the blind detection is higher than a blind detection frequency of a second group of the blind detection, where the first group of the blind detection is before the second group of the blind detection.

In an example, the blind detection configuration information is further configured to indicate that the blind detection frequency of the second group of the blind detection is 1/M of the blind detection frequency of the first group of the blind detection, where M is a positive integer.

In an example, the apparatus further includes:

a transmitting module configured to determine that connected UE associated with the reference signal is not connected to the base station, and the signal configuration information of the reference signal has the blind detection configuration information, and the transmitting module is further configured to stop transmitting the reference signal within predetermined duration.

In an example, the transmitting module is further configured to determine that the reference signal is transmitted after the predetermined duration, and transmit a validation indication indicating that the signal configuration information is validated.

In an example, the transmitting module is further configured to transmit the signal configuration information.

In an example, the reference signal includes:

a TRS and/or a CSI-RS.

According to a fourth aspect of an example of the disclosure, an apparatus for detecting a signal is provided. The apparatus includes: a detection module configured to detect, based on at least one set of signal configuration information of a reference signal, a reference signal associated with the signal configuration information, where the signal configuration information is at least configured to configure a transmission resource for the reference signal, the reference signal is at least configured for synchronization of idle UE and/or inactive UE, and the reference signal is different from an SSB.

In an example, the detection module is configured to detect, based on a state of detection configuration information of the signal configuration information, the reference signal associated with the signal configuration information.

In an example, the detection configuration information includes blind detection configuration information; and the detection module is further configured to carry out at least one of operations as follows:

carrying out, in response to determining that the signal configuration information has the blind detection configuration information, based on the blind detection configuration information, blind detection on the reference signal associated with the signal configuration information; or detecting, in response to determining that the signal configuration information has the blind detection configuration information or does not have the blind detection configuration information, based on a validation indication, the reference signal associated with the signal configuration information, where the validation indication is configured to indicate whether the signal configuration information is validated.

In an example, the detection module is further configured to:

carry out blind detection on the reference signal after a last DRX period in which the reference signal is received based on a transmission resource configured by the signal configuration information.

In an example, the apparatus further includes:

a determination module configured to determine the number of groups of blind detection according to the blind detection configuration information.

In an example, the determination module is configured to determine duration of each group of the blind detection according to the blind detection configuration information; or determine a number N of times of blind detection in each group of the blind detection according to the blind detection configuration information, where N is a positive integer.

In an example, the detection module is further configured to:

carry out a second group of the blind detection in response to determining that a first group of the blind detection does not detect the reference signal, where a blind detection frequency of the second group of the blind detection is lower than a blind detection frequency of the first group of the blind detection.

In an example, the blind detection frequency of the second group of the blind detection is 1/M of the blind detection frequency of the first group of the blind detection, where M is a positive integer.

In an example, the detection module is further configured to:

determine that the validation indication indicating that the signal configuration information is validated is received, and receive the reference signal based on the transmission resource configured by the signal configuration information.

In an example, the apparatus further includes:

a synchronization module configured to determine that the reference signal is detected through the blind detection, and carry out synchronization by means of the reference signal; and determine that no reference signal is detected through the blind detection, and carry out synchronization by means of the SSB.

In an example, the apparatus further includes:

a reception module configured to receive the signal configuration information transmitted by the base station.

In an example, the reference signal includes:

a TRS and/or a CSI-RS.

According to a fifth aspect of an example of the disclosure, a communication device is provided. The communication device includes a processor, a memory and an executable program stored in the memory and capable of being run by the processor, where the processor executes steps of the method for configuring a signal according to the first aspect or the method for detecting a signal according to the second aspect.

According to a sixth aspect of an example of the disclosure, a storage medium is provided. The storage medium stores an executable program, where the executable program implements steps of the method for configuring a signal according to the first aspect or the method for detecting a signal according to the second aspect when executed by a processor.

According to signal configuration method and apparatus, communication device and storage medium provided in examples of the disclosure. A base station is configured with at least one set of signal configuration information of a reference signal, signal configuration information is configured to indicate a detection method for the reference signal associated with the signal configuration information, the signal configuration information is at least configured to configure a transmission resource for the reference signal, the reference signal is at least configured for synchronization of idle UE and/or inactive UE, and the reference signal is different from an SSB. In this way, the base station is configured with at least one set of signal configuration information of a reference signal. On the one hand, the base station may provide signal configuration information associated with a plurality of sets of reference signals respectively for the idle UE and/or the inactive UE for selection, so as to improve flexibility of the UE in selecting the reference signal. On the other hand, the signal configuration information may be configured to indicate a method in which the UE detects the reference signal, so as to reduce the situation that since the UE selects a wrong detection method, detection fails, and improve detection efficiency.

What is claimed is:

1. A method for configuring a signal, performed by a base station and comprising:

configuring at least one set of signal configuration information of a reference signal, wherein the signal configuration information is configured to indicate a detection method for the reference signal associated with the signal configuration information, the signal configuration information is at least configured to configure a transmission resource for the reference signal, the reference signal is at least configured for synchronization of idle user equipment (UE) and/or inactive UE, and the reference signal is different from a synchronization signal block (SSB).

2. The method according to claim 1, wherein a state of detection configuration information of the signal configuration information is configured to indicate the detection method for the reference signal associated with the signal configuration information.

3. The method according to claim 2, wherein the detection configuration information comprises:

blind detection configuration information for the UE to carry out blind detection on the reference signal, wherein the blind detection configuration information is configured to indicate a number of groups of blind detection carried out by the UE on the reference signal.

4. The method according to claim 3, wherein the blind detection configuration information is further configured to indicate:

a duration of each group of the blind detection; or a number N of times of blind detection in each group of the blind detection, wherein N is a positive integer.

5. The method according to claim 3, wherein the blind detection configuration information is further configured to indicate that a blind detection frequency of a first group of the blind detection is higher than a blind detection frequency of a second group of the blind detection, wherein the first group of the blind detection is before the second group of the blind detection.

6. The method according to claim 5, wherein the blind detection configuration information is further configured to indicate that the blind detection frequency of the second group of the blind detection is 1/M of the blind detection frequency of the first group of the blind detection, wherein M is a positive integer.

7. The method according to claim 3, further comprising: determining that connected UE associated with the reference signal is not connected to the base station, and the signal configuration information of the reference signal has the blind detection configuration information, stopping transmitting the reference signal within a predetermined duration.

8. The method according to claim 7, further comprising: determining that the reference signal is transmitted after the predetermined duration, and transmitting a validation indication indicating that the signal configuration information is validated.

9. A non-transitory storage medium, storing an executable program, wherein the executable program implements the method for configuring a signal according to claim 1 when executed by a processor.

10. A method for detecting a signal, performed by user equipment (UE) and comprising:

detecting, based on at least one set of signal configuration information of a reference signal, the reference signal associated with the signal configuration information, wherein the signal configuration information is at least configured to configure a transmission resource for the reference signal, the reference signal is at least configured for synchronization of idle UE and/or inactive UE, and the reference signal is different from a synchronization signal block (SSB).

11. The method according to claim 10, wherein detecting, based on at least one set of signal configuration information of a reference signal, the reference signal associated with the signal configuration information comprises:

detecting, based on a state of detection configuration information of the signal configuration information, the reference signal associated with the signal configuration information.

12. The method according to claim 11, wherein the detection configuration information comprises blind detection configuration information; and detecting, based on the state of detection configuration information of the signal configuration information, the reference signal associated with the signal configuration information comprises at least one of operations as follows:

carrying out, in response to determining that the signal configuration information has the blind detection configuration information, based on the blind detection configuration information, blind detection on the reference signal associated with the signal configuration information; or detecting, in response to determining that the signal configuration information has the blind detection configuration information or does not have the blind detection configuration information, based on a validation indication, the reference signal associated with the signal configuration information, wherein the validation indication is configured to indicate whether the signal configuration information is validated.

13. The method according to claim 12, wherein carrying out, based on the blind detection configuration information, blind detection on the reference signal associated with the signal configuration information comprises:

carrying out blind detection on the reference signal after a last discontinuous reception (DRX) period in which the reference signal is received based on a transmission resource configured by the signal configuration information.

14. The method according to claim 13, further comprising:

determining a number of groups of blind detection according to the blind detection configuration information.

15. The method according to claim 14, further comprising:

determining a duration of each group of the blind detection according to the blind detection configuration information; or determining a number N of times of blind detection in each group of the blind detection according to the blind detection configuration information, wherein N is a positive integer.

16. The method according to claim 14, wherein carrying out, based on the blind detection configuration information, blind detection on the reference signal associated with the signal configuration information comprises:

carrying out a second group of the blind detection in response to determining that a first group of the blind detection does not detect the reference signal, wherein a blind detection frequency of the second group of the blind detection is lower than a blind detection frequency of the first group of the blind detection.

17. The method according to claim 16, wherein the blind detection frequency of the second group of the blind detection is 1/M of the blind detection frequency of the first group of the blind detection, wherein M is a positive integer.

18. A communication device, comprising a processor, a memory and an executable program stored in the memory and capable of being run by the processor, wherein the processor executes the method for detecting a signal according to claim 10 when running the executable program.

19. A non-transitory storage medium, storing an executable program, wherein the executable program implements the method for configuring a signal according to claim 10 when executed by a processor.

20. A communication device, comprising a processor, a memory and an executable program stored in the memory and capable of being run by the processor, wherein the processor, when executing the executable program, is configured to:

configure at least one set of signal configuration information of a reference signal, wherein the signal configuration information is configured to indicate a detection method for the reference signal associated with the signal configuration information, the signal configuration information is at least configured to configure a transmission resource for the reference signal, the reference signal is at least configured for synchronization of idle user equipment (UE) and/or inactive UE, and the reference signal is different from a synchronization signal block (SSB).

* * * * *